C. H. KICKLIGHTER.
METHOD OF JOINING STRUCTURAL STEEL MEMBERS BY ELECTRIC WELDING.
APPLICATION FILED SEPT. 18, 1919.

1,329,413.

Patented Feb. 3, 1920.

INVENTOR
Charles. H. Kicklighter.

UNITED STATES PATENT OFFICE.

CHARLES H. KICKLIGHTER, OF ATLANTA, GEORGIA.

METHOD OF JOINING STRUCTURAL STEEL MEMBERS BY ELECTRIC WELDING.

1,329,413.      Specification of Letters Patent.      Patented Feb. 3, 1920.

Application filed September 18, 1919. Serial No. 324,480.

*To all whom it may concern:*

Be it known that I, CHARLES H. KICKLIGHTER, a citizen of the United States, and a resident of Atlanta, in the county of Fulton and State of Georgia, have invented new and useful Improvements in the Methods of Joining Structural Steel Members by Electric Welding, of which the following is a specification.

The invention relates to a method of joining two structural members, as beams, columns, braces, angle-irons, etc., by means of a welt or fish-plate, the fish-plate having previously been prepared by welding disks or intermediate bodies into depressions cut into the same. The disks project beyond the original surface of the fish-plate, serve to make contact with the surface of the structural members and thus to contract the path of welding current and thereby concentrate its heating effect. Upon bringing the fish-plate into juxtaposition with the structural members and applying pressure and heating electric current, the projecting portions of the disks are welded to the structural members and the disks are softened and forced into the depressions so as to allow the fish-plate and structural members to come into immediate contact.

The invention further relates to a junction between metal elements wherein metal disks are first securely welded electrically into depressions formed in one and afterward welded to the other and forced into the depressions so that the elements come into immediate contact. It also relates to metal structures having their joints formed as above described.

The object of the invention is to afford an easy, simple and practical method of fastening structural steel members by means of electric welding.

The fastening of structural steel members, at the site of erection, by the present methods of spot welding, is difficult and impracticable. This is because of the enormous mechanical pressure and heavy welding current required,—and hence the size and weight of the electric welder prevent its proper handling and adjustment because adequate crane facilities become impracticable. I propose to reduce the mechanical pressure and heating electric current required to minimum values, by using the projecting disks to concentrate the pressure and also the heating effect of the current. This will result in a light and portable welder which can be swung about and adjusted to the work with reasonable crane facilities. I propose to weld the disks securely to the bottoms of the depressions in the fish-plate or similar member at the shops before it is sent to the site of erection. This eliminates all difficulty due to adjusting the disks in the depressions at the site of erection and prevents their being dislodged during the handling of the work and the welding operation. Since the disks have already been thoroughly welded to the fish-plate, the greatest resistance to the passage of the current and hence the most heat will be developed at the contacting surface between the disks and the structural field member just where it is needed. This utilizes the heat to the best advantage and thus effects a saving of current and hence of capacity and weight of welding machine.

Fig. 5 illustrates a depression cut in the fish-plate.

Fig. 6 illustrates the welding of a disk to the bottom thereof.

Fig. 7 illustrates the welded disk projecting from the depression.

Fig. 8 illustrates the welding of the disk surfaces to a structural member.

Fig. 9 illustrates a completed weld between the fish-plate and a structural member.

Figs. $5^n$ to $9^n$, inclusive, illustrate the several steps in the operation similar to those of Figs. 5 to 9, respectively, but wherein the depressions have flat bottoms.

Figure 3:
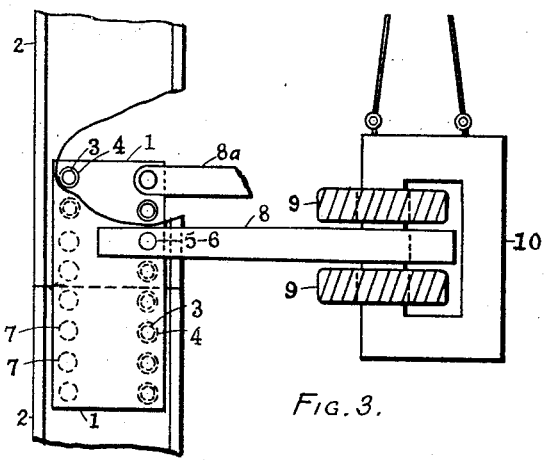
Fig. 3 is a sketch, illustrating a partial view, in elevation, of the operation of Fig. 2.
Figure 1:
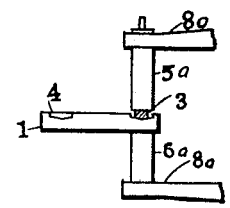
Figure 1 is a sketch, partially sectioned, illustrating the preliminary welding of the disks to the bottoms of the depressions in the fish-plate.
Figure 2:
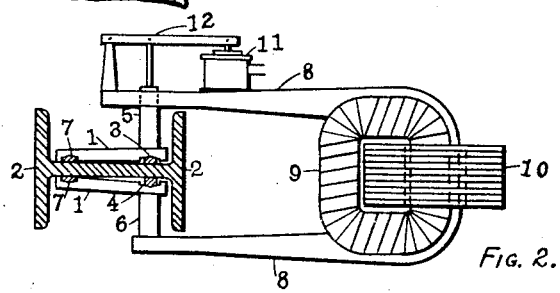
Fig. 2 is a sketch, partially sectioned, illustrating the subsequent welding of the projecting disk surfaces to the webs of two structural I beams.

Referring to Figs. 1 to 4 and especially to Figs. 2 and 3, fish-plates 1—1 are being joined to the web of two structural members 2—2. Intermediate bodies or disks 3—3 have been previously welded into depressions 4—4 of the fish-plates 2—2. Mechanical pressure and welding current are applied by means of electrodes 5—6 of an electric welding machine, of which 8—8 is the secondary conductor, 9—9 the primary windings, 10 is the laminated core, 11 is an electro-magnet for applying pressure and 12 is a lever connection for transmitting the pressure to one of the electrodes. 7 illustrates the disks after the welding operation has been completed and after having been forced into the depressions to allow the parts to come into immediate contact. In Fig. 3, a part of an I-beam 2 is cut away to show how disks 3 have been previously welded into depressions 4 by the current from the secondary 8$^a$ of another welding machine.

Figure 4:
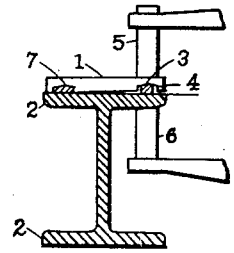
Fig. 4 is a sketch, partially sectioned, illustrating the uniting of the flanges of two I-beams by welding thereto the projecting surfaces of disks which have previously been welded into the depressions of a fish-plate.

Fig. 4 illustrates a fish-plate or welt 1, being joined to the flanges of structural members 2—2. The projecting surface of disk 3, which has previously been welded into depression 4 of the fish-plate 1, is being welded to the flange of member 2—2 by electric welding current passing between the electrodes 5 and 6 of the electric welding machine.

Fig. 1 illustrates the preliminary or preceding operation in which disks 3 are being thoroughly welded to the bottoms of depressions 4 in a fish-plate or welt 1. Pressure and welding current from welding transformed secondary 8$^a$ is being applied by electrodes 5$^a$—6$^a$.

Figure 5:
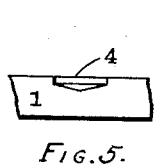
Figs. 5 to 9 illustrate, to enlarged scale, the several steps in the operation, the depressions having conical bottoms.

Fig. 5 shows a depression 4 cut in fish-plate or welt 1.

Figure 6:
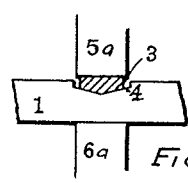

Fig. 6 shows a disk 3 being welded into the depression 4 of plate 1 by electrodes 5$^a$ and 6$^a$.

Figure 7:
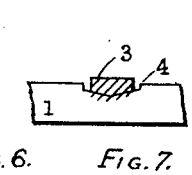

Fig. 7 shows disk 3 after it has been welded into depression 4 as it projects beyond the surface of plate 1.

Figure 8:
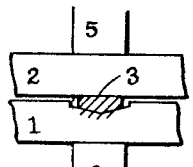

Fig. 8 shows the structural member 2 being welded to the projecting surface of disk 3 by the application of electrodes 5 and 6.

Figure 9:
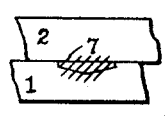
Figure 5N:
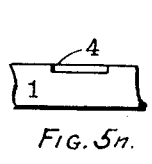
Figure 6N:
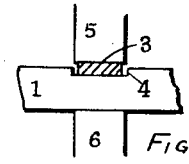
Figure 7N:
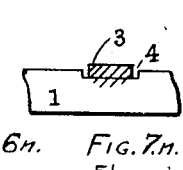
Figure 8N:
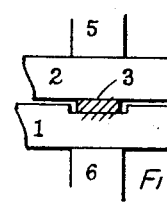
Figure 9N:
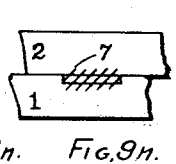

Fig. 9 shows the completed union, the disk having been forced into the depression as shown by 7, so that the plate 1 and member 2 come into immediate contact.

Figs. 5$^a$ to 9$^a$ illustrate operations like those of Figs. 5 to 9 respectively but employing flat disks in flat bottom depressions.

Figure 10:
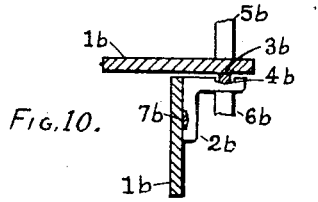
Fig. 10 is a sketch, partially sectioned, illustrating a modified application of the invention.

Fig. 10 shows an angle iron 2$^b$ being used to connect two plates 1$^b$—1$^b$ at right angles. The disk 3$^b$ has been previously welded into depression 4$^b$ of the angle iron 2$^b$. 7$^b$ illustrates a completed weld. This and similar modifications at once suggest themselves.

The operation is apparent. Depressions 4—4 are cut or formed in fish-plate or plates 1—1, disks or intermediate bodies 3—3 are securely welded to the bottoms of these depressions 4—4 by the application of pressure and heating electric current. Subsequently the projecting surfaces of disks 3—3 are brought into contact with the surfaces of structural members 2—2 and welded thereto by the application of pressure and heating electric current. These disks are also softened and forced into the depressions so that the plate or plates 1—1 come into immediate contact with the structural members 2—2.

What I claim is:

1. The method of fastening two structural members together which consists of forming depressions in the surface of a third member, of securely welding by the application of pressure and heating electric current disks or intermediate bodies to the bottoms of the depressions so that their surfaces project beyond the surface of said third member, of subsequently bringing said projecting surfaces into contact with the surfaces of the structural members and by the application of pressure and heating electric current of welding the projecting disk surfaces to the structural members, and forcing them into the depressions so that said third member comes into immediate contact with the said structural members.

2. The method of fastening two structural members together which consists of forming depressions in the surface of a third member, of securely welding by the application of pressure and heating electric current disks or intermediate bodies to the bottoms of the depressions so that their surfaces project beyond the surface of said third member, of subsequently bringing said projecting surfaces into contact with the surfaces of the structural members and by the application of pressure and heating electric current of welding the projecting disk surfaces to the structural members.

3. The method of fastening two pieces of metal together which consists of forming depressions in the surface of one, of thoroughly welding by the application of pressure and heating electric current disks or intermediate bodies to the bottoms of the depressions so that their surfaces project beyond the surface of the piece of metal wherein the depressions are cut, of subsequently bringing the projecting disk surfaces and the surface of the other piece of metal into contact and by the application of pressure and heating electric current of welding the projecting surfaces to the other piece of metal and forcing the disks into the depressions so that the pieces of metal come into immediate contact.

4. The method of fastening two pieces of metal together which consists of forming depressions in the surface of one, of thoroughly welding by the application of pressure and heating electric current disks or intermediate bodies to the bottoms of the depressions so that their surfaces project beyond the surface of the piece of metal wherein the depressions are cut, of subsequently bringing the projecting disk surfaces and the surface of the other piece of metal into contact and by the application of pressure and heating electric current of welding the projecting surfaces to the other piece of metal.

5. Composite metal structures having their elements welded electrically and united by a connecting member, into which depressions have been previously cut and with disks previously welded securely therein.

6. A seam or joint between structural members consisting of metallic disks located therebetween and welded first thoroughly to one member and subsequently welded thoroughly to the other and also forced into depressions so that the structural members come into immediate contact.

7. A seam or joint between structural members consisting of metallic disks located therebetween and welded first thoroughly to one member and subsequently welded thoroughly to the other member.

In testimony whereof I have hereunto signed my name in the presence of two subscribing witnesses at Atlanta, in the county of Fulton and State of Georgia, this 10 day of September, 1919.

CHARLES H. KICKLIGHTER.

Witnesses:
    A. H. McDonald,
    J. E. Medlock.